UNITED STATES PATENT OFFICE.

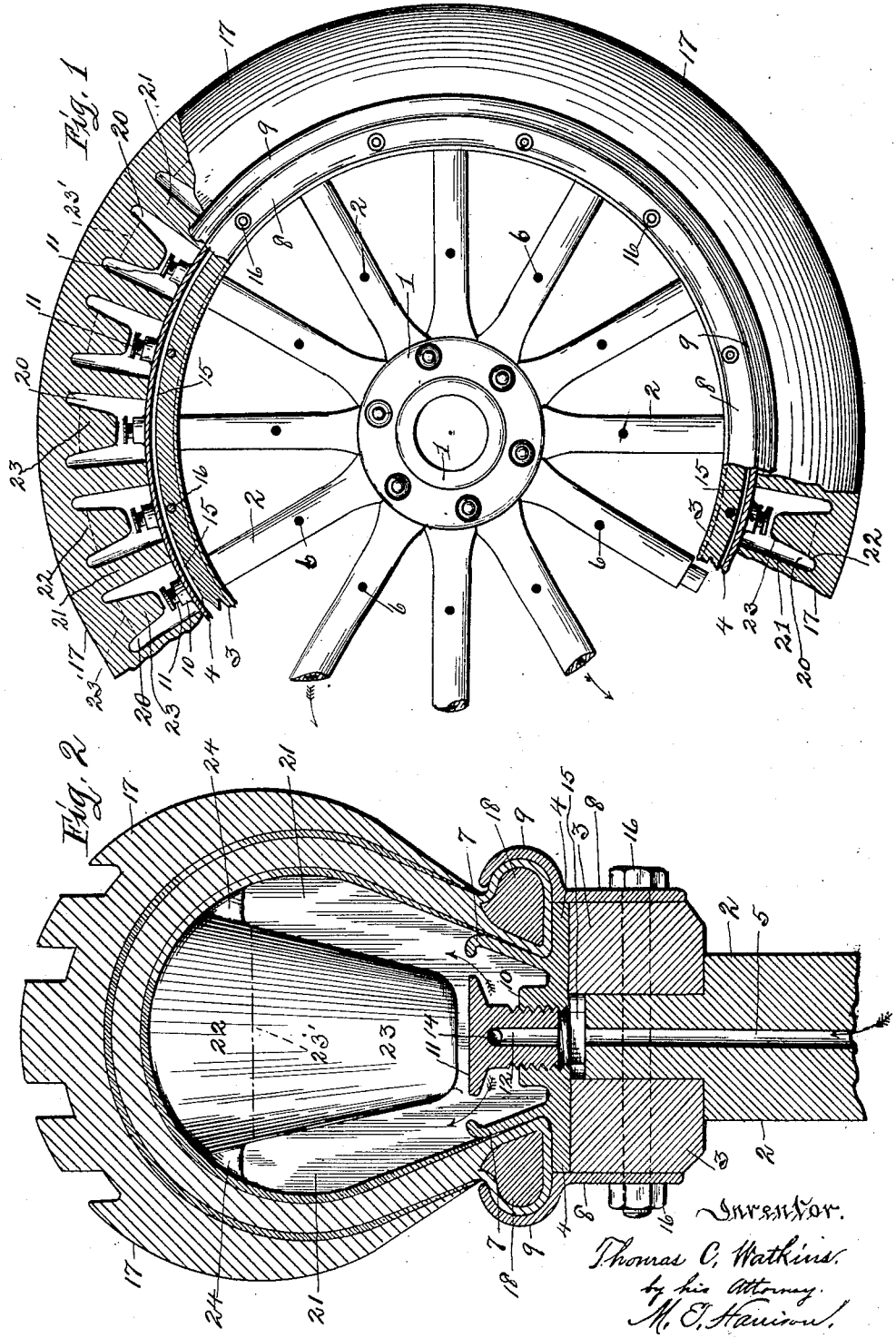

THOMAS C. WATKINS, OF INGRAM, PENNSYLVANIA.

AIR-COOLED VEHICLE-TIRE.

1,324,944.   Specification of Letters Patent.   Patented Dec. 16, 1919.

Application filed August 28, 1919. Serial No. 320,410.

*To all whom it may concern:*

Be it known that I, THOMAS C. WATKINS, a citizen of the United States, residing at Ingram, in the county of Allegheny, State of Pennsylvania, have invented certain new and useful Improvements in Air-Cooled Vehicle-Tires; and I do hereby declare the following to be a full, clear, and exact description of the invention, reference being had to the accompanying drawings, and to the figures of reference marked thereon, which form a part of this specification.

This invention relates to an improvement in air-cooled vehicle tires, and more particularly to that class of tires used in connection with automobile wheels, and the invention consists in forming within the body of the tire, spaced at regular intervals, a series of chambers, the one separated from the other, to give the tire the proper resiliency and with vent openings for air circulation leading therefrom, also, each chamber provided with a rubber core to give support to the tread portion of the tire, the said supports being formed from rubber having a greater coefficient of elasticity than that of the tread of the tire. The invention further consists in so proportioning the partition walls separating the one chamber from the other, in such manner, as to give the proper degree of support to the tread portion of the tire. The invention further consists in the arrangement and location of the air vents and their exit openings, and the invention still further consists in the certain details of construction and combination of parts, as will be fully described hereinafter.

In the accompanying drawings:—

Figure 1 is a side sectional elevation of a vehicle wheel, partly in elevation, showing my improved tire fitted thereon, the said tire being constructed and arranged in accordance with my invention, and Fig. 2 is a full sized cross-sectional view of the tire, said section taken through one of the chambers.

To construct an air-cooled vehicle tire in accordance with my invention and adapt the same for automobile and other vehicle wheels, said wheels each comprising a hub 1, spokes 2, and felly 3, such as are now in common use, I first provide a tire holder, annular in form and of a suitable cast metal, and shrink the same about the periphery of the felly 3, in a manner well known in the art. This holder 4, comprises an annular ring having at spaced intervals corresponding to the spaced chambers of the tire, outwardly-extending flanges 7, to support the inside walls of the tire. Between each pair of these flanges 7, integral with the holder 4, is a boss 10, having a threaded orifice, used as a means of attaching the threaded shank of a table 11. One of these tables is arranged central of each of the air-chambers of the tire 17. Centrally located and about the periphery of the felly 3, is a shallow circumferential groove forming an air-duct 15, which communicates with ducts 5 formed in each spoke 2 of the wheel, said ducts 5, extend from the outer ends of the spokes inwardly to within a short distance of the hub 1, and communicate with the outside atmosphere by means of transverse exits 6. Each threaded shank of the tables 11, is formed with an air-duct 12, and exit 14, said duct 12, communicating with the circumferential groove 15, of the felly 3. This arrangement of air-ducts will permit the cool air from the outside to freely enter the chambers, and the highly heated air within to escape therefrom, as will be hereinafter described.

The tire comprises a cylindrical piece of rubber 17, bent in circular form and divided into a series of chambers 20, the one separated from the other by a partition wall 21 of the same material, each of said chambers being open toward the center of the wheel. Formed central of each chamber 20, opposite to the inner opening of the same, and of the same material as the tire and integral therewith, is a flat-faced boss 22, to which is attached an inwardly-extending core 23, the division being indicated by the broken line 23'. This core is preferably shaped in the form of a frustum of a cone, the small end inward, and is fixed in place by the process of vulcanization, the art of which is well known in the trade. These conical-shaped pieces 23, are made of rubber having a greater coefficient of elasticity than that of the tire 17, and answer the purpose of supporting springs when the tire is taxed beyond its ordinary carrying capacity.

The tire proper, consists of a corded, rubber shoe, built up in any preferred manner, having the usual outwardly-projecting, circumferential beads 18, and is held in position by ring clamps 8, and transverse bolts 16, passing through the said ring plates and through the felly 3. Each of these plates 8, is formed with concaved beads 9, adapted to fit neatly about the beaded portion of the rings, and hold the tire rigidly in position.

The above-described tire when in use, will give the proper resiliency necessary for the wheels of motor-driven vehicles, such as automobiles, auto trucks, &c. It is well known when this class of tires are in use they acquire a high temperature. This temperature is effectually overcome by this construction of tire, as the wheel when in motion, by reason of its load and the compression or partial collapse of the chambers, the air will be discharged and replaced in rapid succession by reason of the elastic nature of the rubber construction, the heated air passing out of the chambers and the cold air siphoned in, thereby forming an air-cooled tire.

The location of the exposed exits or entrance ducts 6, being remote from the tread of the tire 17, will effectually prevent the entrance of mud, water, etc., into said ducts or into the air chambers 20.

Having thus described my invention, I claim:—

1. The combination of a vehicle wheel comprising hollow spokes and felly, a circumferential groove forming an air passage about the periphery of said felly, air ducts formed in said hollow spokes leading from points near the hub and in communication with said groove, a tire holder attached to said felly, a built up tubular tire held in position by said holder, a series of spaced air chambers formed within the body of said tire, a centrally-located rubber block within each of said chambers arranged to leave a surrounding air space, said blocks placed opposite to and free from the tire holder and forming a part of the tire proper, and air ducts entering each of said chambers communicating with the circumferential groove formed in the felly.

2. The combination of a vehicle wheel comprising hollow spokes and felly, a circumferential groove forming an air passage about the periphery of said felly, air ducts formed in said hollow spokes leading from points near the hub and in communication with said groove, a tire holder attached to said felly, a built up tubular tire held in position by said holder, a series of spaced air chambers formed within the body of said tire, a centrally-located rubber block within each of said chambers arranged to leave a surrounding air space, said blocks formed from a rubber having a greater coefficient or ratio of elasticity than that of the body of the tire, said blocks being attached to and forming a part of the tire proper and free from contact with said tire holder, and air ducts entering each of said chambers communicating with the circumferential groove formed in the felly.

In testimony whereof I affix my signature in the presence of two witnesses.

THOMAS C. WATKINS.

Witnesses:
M. E. HARRISON,
HARRY C. MENDEL.